United States Patent [19]

Carp et al.

[11] 4,214,236
[45] Jul. 22, 1980

[54] DRIVER CIRCUIT FOR AN ELECTRICAL LOAD WITH CAPABILITY FOR DETECTING A SHORT IN THE LOAD

[75] Inventors: Ralph W. Carp; William R. Groff, both of Newport News, Va.

[73] Assignee: The Bendix Corporation, Southfield, Mich.

[21] Appl. No.: 947,787

[22] Filed: Oct. 2, 1978

[51] Int. Cl.² ............................................. G08B 21/00
[52] U.S. Cl. ................................... 340/642; 340/641
[58] Field of Search ............... 340/46, 52 F, 641, 642, 340/652, 653, 80; 235/302.4; 364/200, 900

[56] References Cited

U.S. PATENT DOCUMENTS

| | | | |
|---|---|---|---|
| 2,963,692 | 12/1960 | Barter et al. | 340/642 |
| 3,604,949 | 9/1971 | Conzelman | 340/642 |
| 3,774,188 | 11/1973 | Bial et al. | 340/642 |
| 3,801,975 | 4/1974 | Kitomo | 340/642 |
| 3,825,914 | 7/1974 | Schacket | 340/642 |
| 3,883,777 | 5/1975 | Morita | 340/641 |
| 3,903,430 | 9/1975 | Arns | 340/642 |
| 3,944,889 | 3/1976 | Conway | 340/641 |
| 3,947,811 | 3/1976 | Hodgson | 340/52 F |
| 3,987,424 | 10/1976 | Brouwen et al. | 340/642 |
| 4,042,908 | 8/1977 | Amano et al. | 340/654 |

*Primary Examiner*—Gerald Brigance
*Attorney, Agent, or Firm*—Robert C. J. Tuttle; Russel C. Wells; Gaylord P. Haas, Jr.

[57] ABSTRACT

A driver circuit for an electrical load device such as an indicator lamp includes the capability to both drive the lamp and to respond to a fault condition in the lamp to disable its energization. The circuit is adapted for control by a single I/O terminal of a programmable logic device. The I/O terminal being of the type having an internal architecture that causes the terminal to be pulled up to a logic high state when unloaded, and pulled down to a logic low state by either external loading or the closure of an internal; program-controlled switch forming part of a low-impedance path to ground. A processor-implemented test routine can be used to monitor the I/O terminal voltage and close the internal switch when the driver circuit responds to a shorted condition.

8 Claims, 2 Drawing Figures

DRIVER CIRCUIT FOR AN ELECTRICAL LOAD WITH CAPABILITY FOR DETECTING A SHORT IN THE LOAD

TECHNICAL FIELD

This invention relates to driver circuits for electrical loads, and more particularly relates to a driver circuit for an indicator lamp which includes the capability to both drive the lamp and detect a fault condition in the lamp.

BACKGROUND ART

A conventional application for an indicator lamp is in an automobile instrument panel. In this application, one indicator lamp is generally provided for each critical vehicle operating parameter. Upon the occurrence of a malfunction condition in a critical operating parameter, a respective indicator lamp will become energized to indicate to the vehicle operator the existence of the malfunction.

In the current generation of automotive technology, a relatively greater number of vehicle operating parameters have become critical or significant to the proper operation of the vehicle. A specific example is a case of vehicles equipped with an electronic fuel injection (EFI) system. As EFI will control fuel injection characteristics on the basis of several significant engine operating parameters, e.g. manifold air pressure, exhaust gas recirculation, air temperature, coolant temperature, $O_2$, RPM and speed command are all types of parameters used by various EFI systems. With this expanded class of parameters comes the desire to include the capability to notify the vehicle operator of a malfunction in the sensing of any one of the conditions which may adversely affect EFI control. Accordingly, there is a commensurate need to expand the number of indicator lamps or similar type display devices on the instrument panel.

However, there is for practical purposes a limitation on the number of indicator lamps or display devices that can be driven by the control logic of an EFI system. More specifically, most practical EFI systems are presently being designed with microprocessors implementing the control logic. A commerical microprocessor has a limited number of input/output (I/O) terminals available for assignment to driving indicator lamps. Moreover, in addition to driving the lamp, it is important that the control logic include the capability to detect a short or similar type fault condition in the lamp circuitry itself to disable energization of the lamp if that should occur. This latter capability places a further demand on the I/O resources of the microprocessor.

An important objective of the present invention is to therefore provide the capability to both control energization of an indicator lamp and detect a short or fault condition in the lamp circuitry with a minimal demand on available microprocessor I/O terminals. It is a specific objective to provide a driver circuit and associated method of operation that requires only one microprocessor I/O terminal for each indicator lamp or similar type display device.

DISCLOSURE OF THE INVENTION

The present invention is an electrical indicator device driver circuit and associated method of operation for both driving an indicator device and monitoring its operation for a fault condition. The invention provides economy in terms of use of processor I/O terminals in accomplishing these functions.

Broadly, the invention contemplates its use with a programmable processing unit of the type having at least one bidirectional I/O terminal. More specifically, with this type of I/O terminal, the terminal voltage is normally held high or in an energized condition by an internal pull-up resistor within the processor. When the I/O terminal drives an external load, this normally high terminal voltage is pulled low by the effect of the load. In addition, the normally high terminal voltage can be pulled down by an internal switch within the processor connected between the terminal and ground. The internal switch is typically software-controlled.

The driver circuit of the present invention takes advantage of the normally hign voltage at the I/O terminal to drive an electrical indicator device such as a lamp or the like. The indicator device or lamp represents a unit load which when being driven causes the voltage at the I/O terminal to be pulled down to a logical low level. Thus, if a malfunction exists in a vehicle operating parameter that causes the indicator device to be energized, the voltage at the I/O terminal will be low or pulled down by the effect of driving the indicator device. However, if the malfunction condition in the vehicle operating parameter persists, and the indicator device or lamp circuitry has shorted, the driver circuit of the present invention will respond by causing the voltage at the I/O terminal to revert to its normally high level.

A test routine at the software level is then executed periodically to test the voltage level at the I/O terminal used to drive the indicator device. If the malfunction condition of the engine operating parameter is extant and the voltage level at the I/O terminal is low, the test routine will leave open the internal software-controlled switch. However, if the I/O terminal voltage is high, the internal switch will be closed to pull down the terminal voltage so that the driver circuit will be effectively deenergized to protect it from needlessly dissipating excessive amounts of energy and heating beyond its tolerable limits.

Other advantages of the present invention will be readily appreciated as the same becomes better understood by reference to the following detailed description when considered in connection with the accompanying drawings.

BEST MODE FOR CARRYING OUT THE INVENTION

Figure 1:
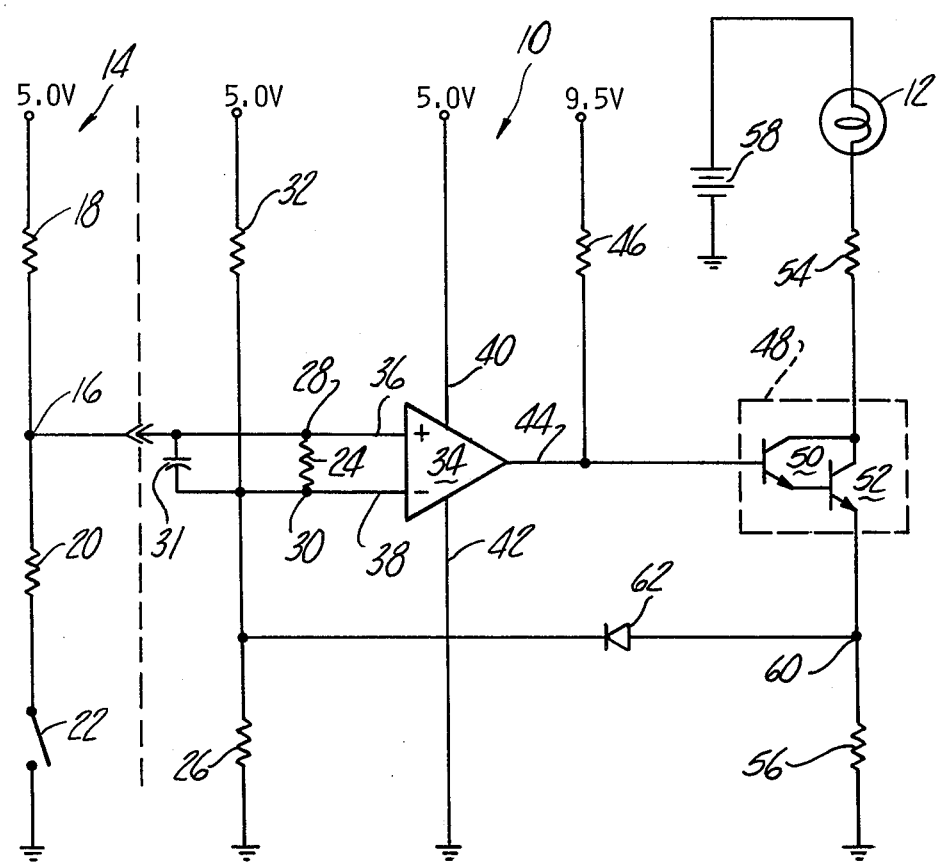
FIG. 1 is a schematic view of an indicator lamp driver and fault detector circuit of the present invention shown in conjunction with a pertinent portion of a microprocessor unit.

FIG. 1 is a schematic illustration of a driver circuit 10 embodying the present invention driving an indicator lamp 12 under the control of an input/output (I/O) terminal 16 of a programmable logic device 14 such as a microprocessor. In general, the functions of the driver circuit 10 are to energize the indicator lamp 12 upon the occurrence of a malfunction in a respective system operating parameter, and to respond to a short or similar type fault condition in the indicator lamp circuitry by disabling the energization of the lamp. When the driver circuit 10 performs its latter function it causes a low-to-high transition in the logic state at the I/O terminal 16. This transition can be detected by a software-implemented test routine which is intermittently executed to test the logic state of the I/O terminal 16. In conventional application, the system operating parameter experiencing a malfunction condition can be a vehicle engine sensor or the like and the indicator lamp 12 can appear on the vehicle instrument panel.

The driver circuit 10 is suited to the internal architecture of the I/O terminal 16 of the programmable logic device 14. A brief description of the internal architecture of the I/O terminal 16 will be provided before advancing to a detailed description of the driver circuit 10.

More specifically, the I/O terminal 16 of the programmable logic device 14 inclues a pull-up resistor 18 connected between +5 volt source and the I/O terminal output line. Another resistor or low impedance component 20 is connected in series with a software-controlled switch 22 between the I/O terminal output line and ground.

Under normal conditions, the switch 22 is open and the resistor 18 pulls up the I/O terminal 16 to a logic high state. The logic level at the terminal 16 can be pulled down in either of two ways. First, it may be pulled down by connecting a unit load to the terminal 16. Secondly, it may be pulled down by closing the internal software-controlled switch 22 to create a low impedance path from the terminal 16 to ground. A practical example of a programmable logic device 14 employing the type of internal architecture herein described is an Intel 8048/8748 Single Chip Microcomputer of the type manufactured by Intel Corporation, 3065 Bowers Avenue, Santa Clara, CA. 95051. These types of microcomputers each have two quasi bidirectional 8-bit ports. Each terminal of the 8-bit ports has an internal architecture as herein described to provide for bidirectional signal communication. The Intel 8048/8748 Single Chip Microcomputer is fully documented in the *Intel MCS-48 Microcomputer User's Manual*, Sec. 2.1.4, 1978.

The driver circuit 10 includes a pair of resistors 24 and 26 which form a voltage sensing circuit. The common terminus of the I/O terminal 16 and resistor 24 defines an I/O terminal sensing point 28. The common terminus of the resistor 24 and the resistor 26 defines an output feedback sensing point 30.

A resistor 32 is connected between +5 volts and the sensing point 30. Under normal operating conditions where the software-controlled switch 22 is open and the pull-up resistor 18 controls the logic state of the I/O terminal 16, the resistors 32 and 26 will define a voltage level at the sensing point 30 below that of the voltage level at the sensing point 28. A capacitor 31 is connected between the I/O terminal line 16 and the sensing point 30 to filter out spurious high frequency signals.

A comparator 34 has a positive input terminal 36 connected to the sensing point 28, and a negative input terminal 38 connected to the sensing point 30. The function of the comparator is to produce a high output signal when the voltage at its positive input terminal 36 exceeds the voltage at its negative input terminal 38, and conversely, to produce a low output signal when the voltage at its negative input terminal exceeds the voltage at its positive input terminal. The compatator 34 has a conventional power terminal 40 connected to +5 volts, and a ground terminal 42 connected to ground. The output signal of the comparator which appears on line 44 is pulled up by the application of +9.5 volts through a pull-up resistor 46.

The energization of the lamp 12 is enabled by a voltage-controlled switch, indicated generally at 48. The switch 48 comprises a Darlington-connected pair of transistors 50 and 52. The transistor 50 has applied to its base terminal the comparator output signal on line 44. Its collector terminal is connected in common with collector terminal of the transistor 52, and its emitter terminal is connected to the base terminal of the transistor 52.

The balance of the indicator lamp circuit includes a battery or DC source 58 connected to one side of the lamp 12. A resistor 54 is connected between the other side of the lamp 12 and one side of the voltage-controlled switch 48. Another resistor 56 is connected between the other side of the voltage-controlled switch 48 and ground.

The connection of the resistor 56 with the emitter terminal of the transistor 52 defines a node 60. The voltage at the node 60 is used as an output feedback voltage to indicate the presence of a fault in the lamp circuitry. A diode 62 is connected between the node 60 and the sensing point 30. The diode 62 has its anode connected to the node 60, and its cathode connected to the sensing point 30.

The operation of the driver circuit 10 is described as follows. If a system parameter for which the indicator lamp 12 is used should enter into a malfunction condition, e.g. engine overheating, $O_2$ sensor defect or the like, the logic of the microprocessor 14 will cause the internal switch 22 to open. When the switch 22 is in its open state, it permits the pull-up resistor 18 to energize the I/O terminal 16. When the I/O terminal is unloaded, the effect of opening the switch 22 will be to cause the voltage at I/O terminal 16 to go to a logic high state. However, as will be described presently, the loading of the I/O terminal 16 by the lamp 12 will effectively put down its voltage to a logic low state.

With the switch 22 in open condition, the voltage developed at the I/O terminal 16 is applied across the resistors 24 and 26. The voltage appearing at the I/O terminal sensing point 28 will be relatively greater than the voltage appearing at the output feedback sensing point 30. The voltage appearing at the sensing point 28 is applied to the input terminal 36 of the comparator 34, and the voltage appearing at the sensing point 30 is applied to the input 38 of the comparator.

Under these conditions, the comparator 34 will produce a high level output signal on line 44. This signal is applied to the base terminal of the transistor 50 causing it to become conductive. Similarly, the base terminal of the transistor 52 receives current from the emitter terminal of the transistor 50 causing it to likewise become conductive. Thus, the circuit in which the indicator lamp 12 is present is completed and the lamp is energized by the battery 58.

During normal energization of the indicator lamp 12, the voltage level appearing at the node 60 will be below the voltage appearing at the output feedback sensing point 30. Accordingly, the diode 62 is back biased and non-conductive.

In the event of a short in the indicator lamp circuitry, the voltage level at node 60 will rise. This will cause the diode 62 to become forward biased and communicate the voltage at the node 60 directly to the sensing point 30 and indirectly to the sensing point 28. In so doing, the voltage at the sensing point 28 is brought up to a logic high state.

The voltage at the I/O terminal sensing point 28 can be monitored intermittently by the execution of a software-based test program. Upon detection of a logic high state at the sensing point 28, the test program will close the internal switch 22. The closure of the switch 22 will pull down the I/O terminal 16 by connecting it through the resistor or low-value impedance component 20 to ground.

Accordingly, by closing the switch 22 the voltage at the I/O terminal sensing point 28 will fall below the voltage at the output feedback sensing point 30. This will in turn cause the output signal of the comparator 34 to go low. A low comparator output signal on line 44 will cause the voltage-controlled switch 48 to become non-conductive and disable energization of the indicator lamp 12.

Figure 2:
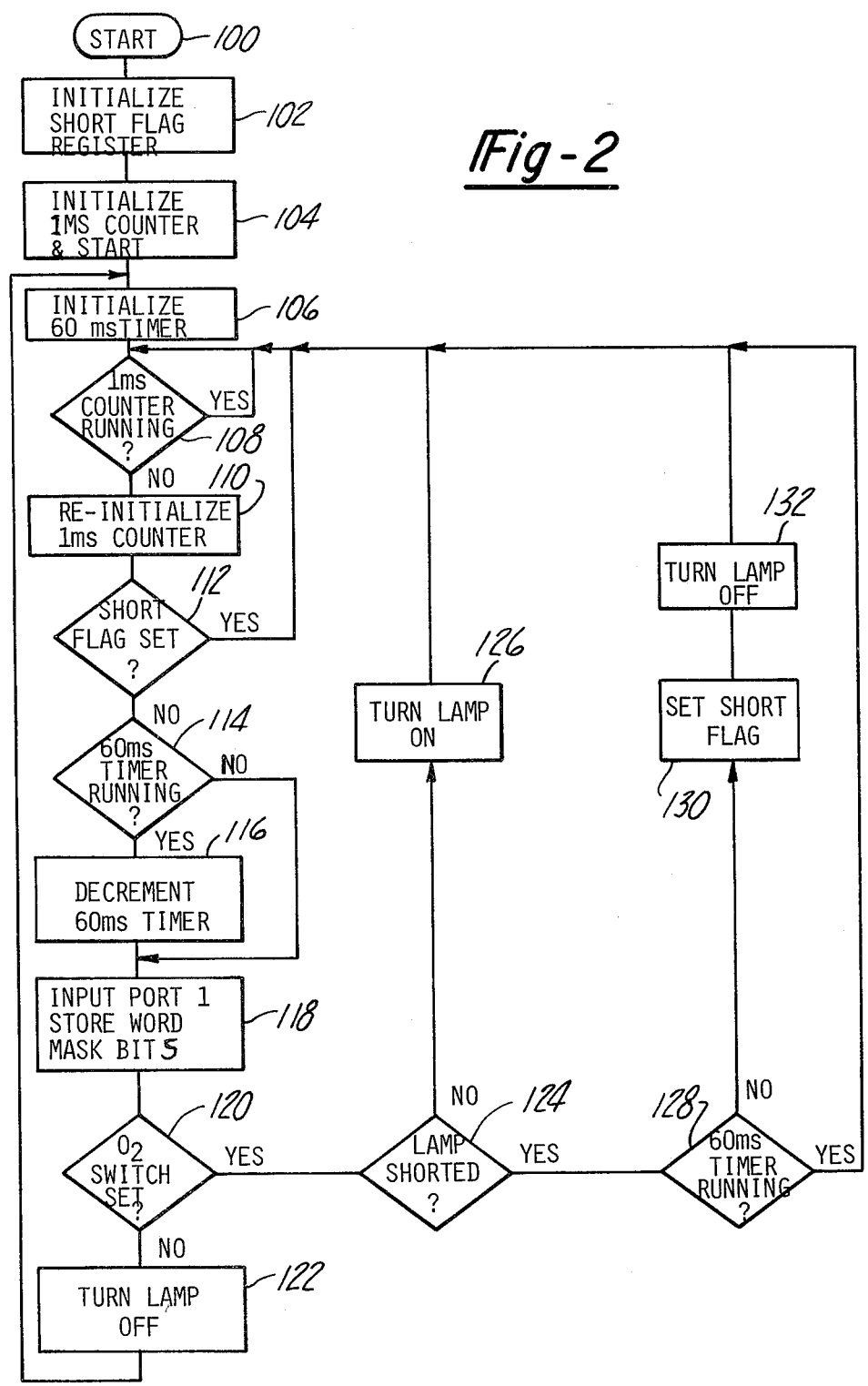
FIG. 2 is a flowchart of an indicator lamp test routine which is executed by the microprocessor to monitor the condition of the indicator lamp.

FIG. 2 is a flowchart representing a test program suitable for use with the driver circuit 10. As a preface to a detailed description of the test program, the following assumptions are made. First, it is assumed that the indicator lamp is being used to indicate the occurrence of a malfunction in a system parameter and that upon the occurence of the malfunction a status bit or switch accessible to the programmable logic device 14 will be set to signify the same. Second, it is assumed that the I/O terminal used to control the driver circuit forms one bit of an 8-bit port on the microprocessor. Third, it is assumed that there is a 1 ms counter on the programmable logic device, as is the case with the Intel 8048 family of microcomputers. Fourth, it is assumed that there is a 60 ms response time required for the lamp to change from a cold-filament, low resistance element to a hot-filament, high resistance element upon energization of the lamp.

In step 100, the test program is started. In step 102, a short flag register is initialized by being cleared or set to zero. When the short flag is 0 it indicates that no short is present in the indicator lamp circuitry, and, conversely, when the flag is 1 it indicates that a short exists. In step 104 the 1 ms counter on the microprocessor is initialized and started. In step 106 a 60 ms timer is started.

In decision 108, the 1 ms counter is tested to determine if it is still running. If so, the YES branch is taken to reentry of the decision; i.e. the program will loop until 1 ms has elapsed. At the end of 1 ms, the program will follow the NO branch from the decision to step 110. In step 110, the 1 ms counter is re-initialized.

In decision 112, the short flag is tested to see if it has been set. If so, it indicates that a short condition exists and energization of the lamp is to be prevented. In such a case, the YES branch is taken to the reentry of decision 108 causing the program to reiterate through the closed loop thus defined. If the short flag is not set, the NO branch is taken to decision 114.

In decision 114, a test is made to determine if the 60 ms timer is still running. The 60 ms timer is used to account for the time required for the lamp filament to heat up. Initially, when the lamp filament is cold, its resistance is much less than when it stabilizes at a higher temperature. The test program assumes that it will take approximately 60 ms for the temperature and resistance of the lamp filament to stabilize. If the 60 ms timer is still running, the YES branch is taken to the entry of step 116. In step 116, the 60 ms timer is decremented by one. The NO branch from decision 114 and the flow from step 116 both enter step 118.

In step 118, the program reads the 8-bit binary word on the port in which the I/O terminal is present. For purposes of the test program it is assumed that the port is identified as Port 1 and the I/O terminal of interest is bit 5. Accordingly, to obtain the logic state of the I/O terminal, bit 5 is read by masking off all other bits in the word.

In decision 120, a test is made to determine if a malfunction exits in the system parameter associated with the indicator lamp and the lamp is to be turned on. The test can be made on the status bit or switch used for this purpose, which is assumed to be accessible to the programmable logic device. If not, the NO branch is taken to step 122. In step 122, energization of the indicator lamp is disabled by closure of the internal switch 22. The flow from step 122 reenters step 106.

If the test of decision 120 is satisfied, the YES branch is taken to the entry of decision 124. In decision 124 a test is made to determine if the indicator lamp circuitry is shorted. This test is implemented by checking the logic state of bit 5 of port 1. If set, it indicates that a short exists; and if not, then the lamp is functioning properly. If the lamp circuitry is not shorted, the NO branch of decision 124 is taken to step 126. In step 126 the lamp is kept on by maintaining open the internal switch 22. The flow from step 126 reenters decision 108.

If a short in the lamp circuitry exists, the YES branch of decision 124 is taken to the entry of decision 128. In decision 128 a test is made to determine if the 60 ms timer is running. If so, it indicates that the transition time between energization of the indicator lamp and the stabilization of its filament temperature and resistance has not elapsed, and the YES branch is taken to reentry of decision 108.

If the 60 ms timer is no longer running, the NO branch is taken to step 130. In step 130 the short flag is set. In step 132 the lamp is turned off by closing the switch 22. The flow from step 122 reenters decision 108.

The execution of the test program may be initialized by any of a number of methods. In the present description, it is shown as a stand-alone program. However, it may be used as a subroutine that is called by a main program, or its execution may be initiated by regular software interrupts. Moreover, its logic may be modified to include a return to a main program; in such a case, it would be sufficient to have the test program set the short flag and thereafter exit to another program.

The invention has been described in an illustrative manner and it is to be understood that the terminology which has been used is intended to be in the nature of words of description rather than of limitation. Many modifications and variations of the present invention are possible in light of the above teachings. It is, therefore, to be understood that within the scope of the appended claims, the invention may be practiced otherwise than as specifically described.

The embodiments of the invention in which an exclusive property or privilege is claimed are defined as follows:

1. A driver circuit for use with a programmable electronic logic device of the type having at least one bidirectional input/output (I/O) terminal which is pulled up to a normally logic high state when unloaded and pulled down to a logic low state when loaded and further having program-controlled internal switching means for pulling down the I/O terminal to a logic low state by program control, the driver circuit being adapted to drive a d.c. electrical load under normal load conditions and respond to a shorted load under abnormal load conditions, the circuit comprising:

- a voltage sensing circuit connected between the I/O terminal and a reference potential, the voltage sensing circuit having an I/O terminal sensing point and an output feedback sensing point, the voltage at the I/O terminal sensing point being normally greater than the voltage at the output feedback sensing point under normal load conditions;
- comparator means, connected to the voltage sensing circuit and responsive to the voltage difference between the I/O terminal sensing point and the output feedback sensing point, for comparing the voltages at the sensing points and producing an output signal at a first level when the I/O terminal sensing point voltage exceeds the output feedback sensing point voltage, and at a second level when the output feedback sensing point voltage exceeds the I/O terminal sensing point voltage;
- driver switch means, responsive to the output signal of the comparator means, for enabling energization of the electrical load upon the occurrence of a comparator output signal at the first level and disabling energization of the load upon the occurrence of a comparator output signal at the second level; and
- output feedback means, connected between the driver switch means and the output feedback sensing point, for communicating a feedback voltage to the output feedback sensing point upon the occurrence of a short condition to cause the voltages at the output feedback sensing point and I/O terminal sensing point to enter a logic high state that can be detected by program logic and used to cause the internal switch means to close and pull down the I/O terminal, thereby disabling energization of the electrical load.

2. The driver circuit as defined in claim 1 wherein the voltage sensing circuit includes a resistor interconnected between the I/O terminal sensing point and the output feedback sensing point.

3. The driver circuit as defined in claim 1 wherein the voltage sensing circuit includes the serial connection of first and second resistors, the I/O terminal sensing point being defined as the common terminus of the first resistor and the I/O terminal, and the output feedback sensing point defined as the common terminus of the first and second resistors.

4. The driver circuit as defined in claim 3 further comprising a filtering capacitor connected in parallel across the first resistor.

5. The driver circuit as defined in claim 1 wherein the driver switch means includes a voltage-controlled switch.

6. The driver circuit as defined in claim 5 wherein the voltage-controlled switch includes at least one transistor.

7. The driver circuit as defined in claim 5 wherein the voltage-controlled switch comprises a Darlington-connected transistor pair.

8. The driver circuit as defined in claim 1 wherein the output feedback means comprises a diode having its anode connected to the driver switch means and its cathode connected to the output feedback sensing point.

* * * * *